(12) United States Patent
Ganzhorn et al.

(10) Patent No.: US 10,242,139 B2
(45) Date of Patent: Mar. 26, 2019

(54) SCHEME AND DESIGN MARKUP LANGUAGE FOR INTEROPERABILITY OF ELECTRONIC DESIGN APPLICATION TOOL AND BROWSER

(71) Applicant: Synopsys, Inc., Mountain View, CA (US)

(72) Inventors: Salem Lee Ganzhorn, Apex, NC (US); Donald John Oriordan, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/472,216

(22) Filed: Mar. 28, 2017

(65) Prior Publication Data

US 2017/0286581 A1    Oct. 5, 2017

Related U.S. Application Data

(60) Provisional application No. 62/315,173, filed on Mar. 30, 2016.

(51) Int. Cl.
*G06F 17/50* (2006.01)

(52) U.S. Cl.
CPC ........ *G06F 17/505* (2013.01); *G06F 17/5036* (2013.01); *G06F 17/5072* (2013.01); *G06F 17/5077* (2013.01); *G06F 2217/12* (2013.01); *Y02P 90/265* (2015.11)

(58) Field of Classification Search
CPC .................................................... G06F 17/5054
USPC .......................................................... 716/102
See application file for complete search history.

(56) References Cited

U.S. PATENT DOCUMENTS

| | | | | |
|---|---|---|---|---|
| 6,594,799 B1 * | 7/2003 | Robertson | ........... | G06F 17/5045 707/999.01 |
| 6,634,008 B1 * | 10/2003 | Dole | ................... | G06F 17/5045 707/999.01 |
| 7,047,180 B1 * | 5/2006 | Mathews | .......... | G06F 17/30569 358/1.15 |
| 7,770,113 B1 * | 8/2010 | Anderson | ........... | G06F 17/2247 715/272 |
| 7,835,896 B1 * | 11/2010 | Rode | ........................ | G06F 9/54 703/14 |
| 9,021,349 B1 * | 4/2015 | Chernetsov | ......... | G06F 17/5045 715/235 |
| 2002/0156757 A1 * | 10/2002 | Brown | ................... | G06Q 10/06 |

(Continued)

*Primary Examiner* — Suchin Parihar
(74) *Attorney, Agent, or Firm* — Fenwick & West LLP

(57) ABSTRACT

A bi-directional EDA-browser bridge mechanism enables an EDA system and its related (external) tools to interact with a browser. The EDA-browser bridge uses a design markup language (DML) to communicate with the browser, using a document-based approach rather than a more traditional programming/API-based approach to extending (e.g., integrating tools) the EDA system. By using a markup language, extending the EDA system becomes more accessible to a wider community of developers (e.g., those with web development skills, as opposed to those with just EDA programming skills), and be able to leverage a wider variety of powerful third-party libraries, such as jQuery or D3. For example, developers are able to more easily generate interactive interfaces for viewing results related to the EDA system.

20 Claims, 7 Drawing Sheets

(56) References Cited

U.S. PATENT DOCUMENTS

| | | | |
|---|---|---|---|
| 2006/0168558 A1* | 7/2006 | de Seabra e Melo | G06F 9/451 |
| | | | 717/105 |
| 2008/0222580 A1* | 9/2008 | Banerjee | G06F 17/5045 |
| | | | 716/136 |
| 2015/0302130 A1* | 10/2015 | Hirschman | G06F 17/5072 |
| | | | 716/137 |
| 2018/0212839 A1* | 7/2018 | Hiers | H04L 41/12 |

* cited by examiner

400

450

SCHEME AND DESIGN MARKUP LANGUAGE FOR INTEROPERABILITY OF ELECTRONIC DESIGN APPLICATION TOOL AND BROWSER

CROSS-REFERENCE TO RELATED APPLICATION

This application claims the benefit of U.S. Provisional Patent Application Ser. No. 62/315,173, entitled "Scheme and Design Markup Language for Interoperability of Electronic Design Application Tool and Browser" and filed on Mar. 30, 2016, which is hereby incorporated by reference in its entirety.

BACKGROUND

1. Field of the Invention

This disclosure relates generally to designing integrated circuits (ICs), and more specifically to extending electronic design application tool platforms.

2. Description of Related Art

Electronic design automation (EDA) systems provide subsystems for extending and customizing the EDA system. These subsystems allow the user to interact with integrated circuit (IC) design data, and perform specialized EDA action, such as data object highlighting, navigating markers, creating probes, annotating text, executing jobs, and creating graphical user interfaces (GUI's). The application programming interfaces (APIs) of these subsystems enable users to integrate additional tools (e.g., external tools) into the EDA system, providing highly customizable functionality. To interact with the APIs, users must learn both the programming language in which the API is based and how to use the API (e.g., what functions and procedures are available, what they do, what arguments or parameters they accept, what kind of data they generate or return). Due to the specific EDA functionality needed, the programming languages used for these APIs are rarely used outside of the EDA context. Thus, extending or customizing the EDA system requires a significant investment from a user who is not already familiar with the EDA-specific programming languages and APIs.

Many other programming languages are considered more accessible, with many applications outside of EDA. Web programming languages, such as hypertext markup language (HTML) and JavaScript, are particularly accessible due to standardization and widely accepted conventions in web development. However, these languages are not used for EDA applications because they do not adequately capture the behavior of the IC design objects that are central to EDA system functionality. Additionally, the browsers that render web programming languages are unfamiliar with these IC design objects.

SUMMARY

A bi-directional EDA-browser bridge mechanism enables an EDA system and its related (external) tools to interact with a browser. The EDA-browser bridge uses a design markup language (DML) to communicate with the browser, using a document-based approach rather than a more traditional programming/API-based approach to extending (e.g., integrating tools) the EDA system. By using a markup language, extending the EDA system becomes more accessible to a wider community of developers (e.g., those with web development skills, as opposed to those with just EDA programming skills), and can leverage a wider variety of powerful third-party libraries, such as jQuery or D3. For example, developers can more easily generate interactive interfaces for viewing results related to the EDA system.

Embodiments involve receiving a markup language document that has one or more references encoded in a scheme registered with a browser. Each of the one or more references represents an integrated circuit (IC) design object in an electronic design automation (EDA) system. A page of information is generated by rendering the markup language document, A user interaction associated with a reference of the one or more references in the generated page of information is received. The reference is sent to the EDA system to cause the EDA system to identify and perform one or more EDA operations on the IC design object associated with the reference.

Other embodiments involve receiving a reference that is encoded in an EDA scheme from a browser. An EDA system interprets the reference to identify an integrated circuit (IC) design object in the EDA system on which one or more EDA operations are to be performed. The one or more EDA operations to perform on an integrated circuit (IC) design object are determined based on the reference, and the EDA system performs the one or more EDA operations on the IC design object.

BRIEF DESCRIPTION OF THE DRAWINGS

Figure (FIG. 1 is a flowchart illustrating various operations for designing and fabricating an integrated circuit (IC), according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview of EDA Design Flow

Figure 1:
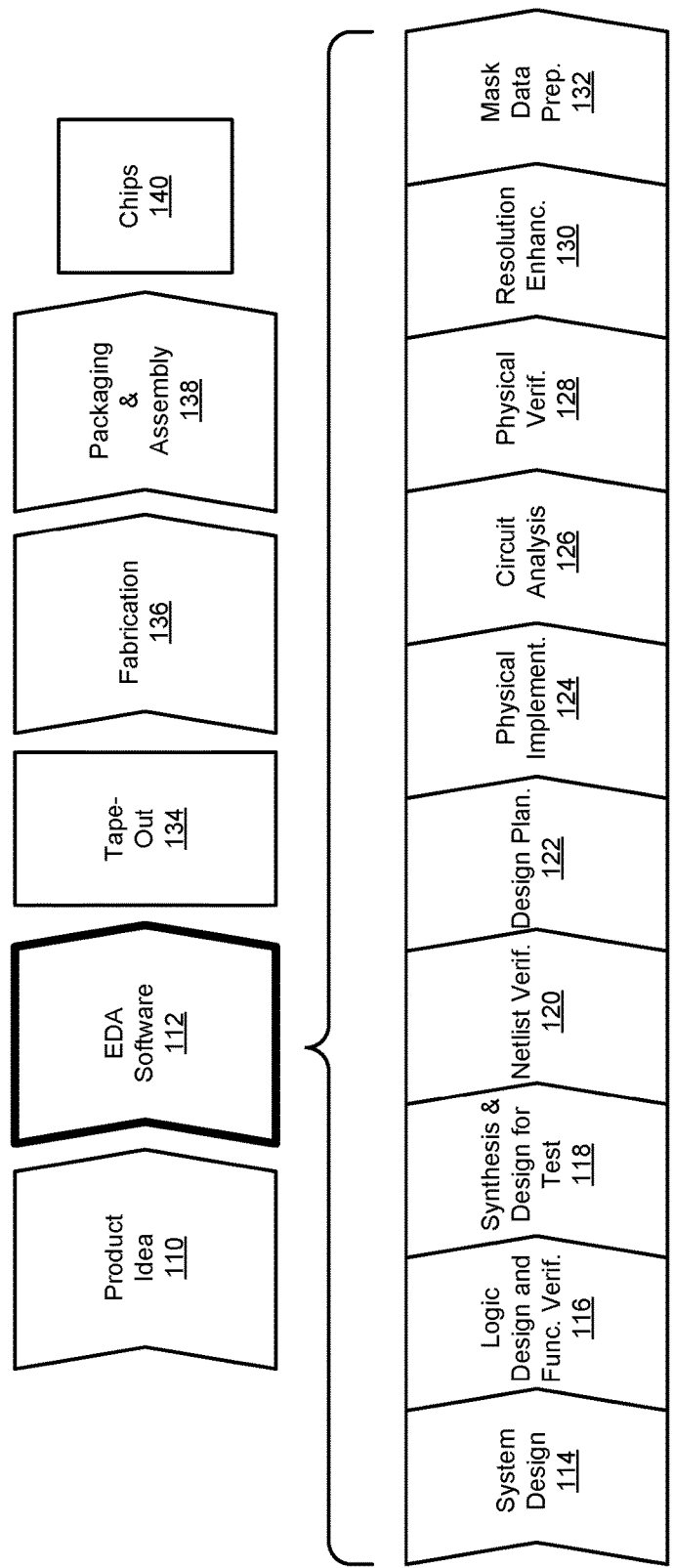

FIG. 1 is a flowchart illustrating various operations for designing and fabricating an integrated circuit, according to one embodiment. The design process 100 starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the integrated circuit design. Packaging and assembly processes 138 are performed, which result in finished chips 140.

Figure 2:
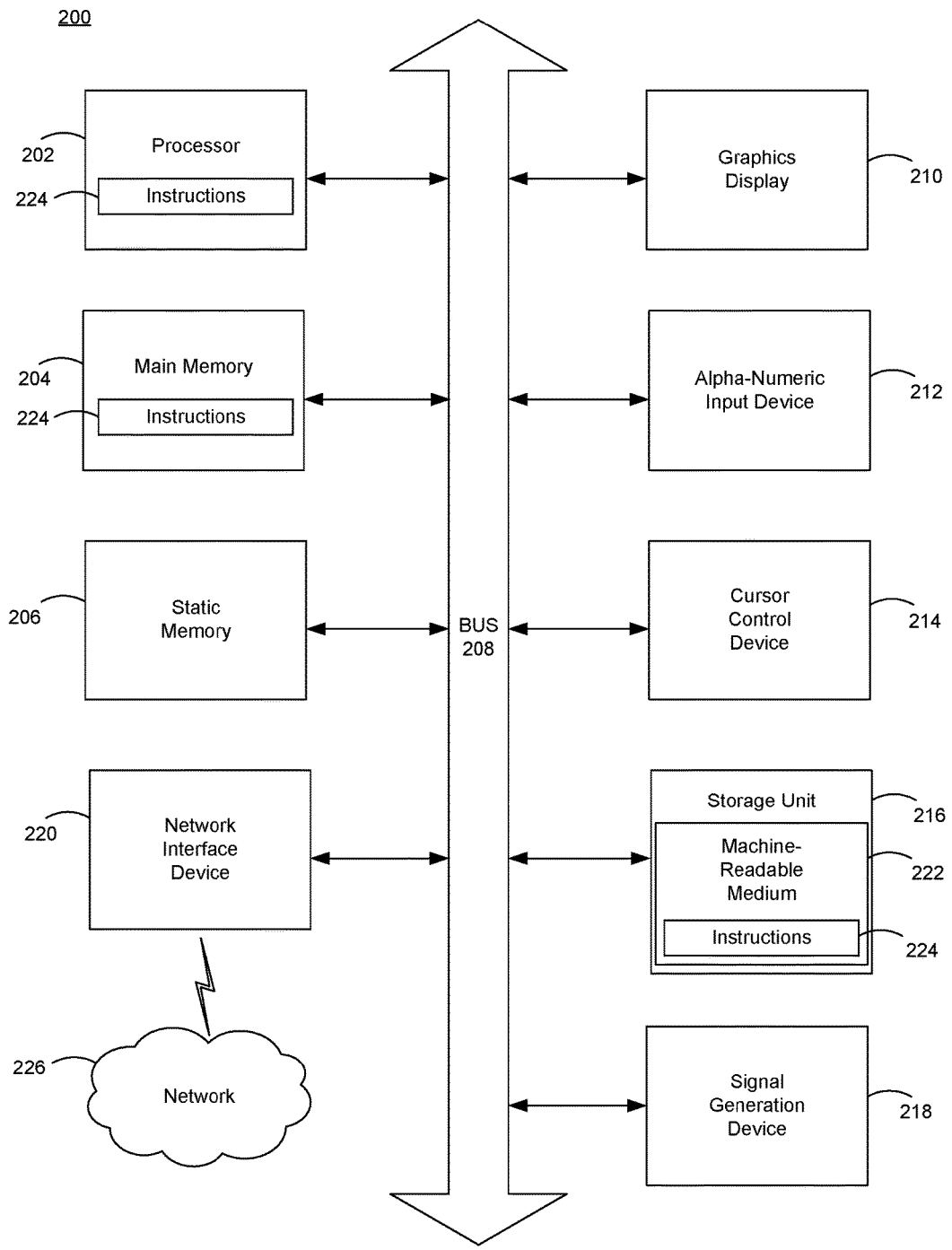
FIG. 2 is a high-level block diagram illustrating an example of a computing device for performing custom designing of an IC, according to one embodiment.

The EDA software 112 may be implemented in one or more computing devices such as the computing device 200 of FIG. 2. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual integrated circuit design may require a user to perform the design operations in a difference sequence than the sequence described herein.

During system design 114, users describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Schematic entry and editing, in particular, is part of physical implementation 124. Some design blocks (e.g., digital functionality) may be implemented via logic languages such as RTL or Verilog, which others (e.g., analog functionality) may be edited via a schematic editor. Example EDA software products from Synopsys, Inc. of Mountain View, Calif. that can be used at this stage include: Custom Compiler®, the Astro® and IC Compiler® products. Embodiments described herein relate primarily to the physical implementation 124.

During circuit analysis 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the IC Validator® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products. Formal verification may be performed at the stage of logic design and functional verification 116. Low power design specification is typically processed during stages synthesis and design for test 118 or netlist verification 120.

Embodiments of the present disclosure can be used during one or more of the above-described stages. Specifically, embodiments may be used for the processes of design planning 122 and physical implementation 124.

Computing Device Overview

FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

EDA System Capable of Interacting with a Browser

Figure 3:
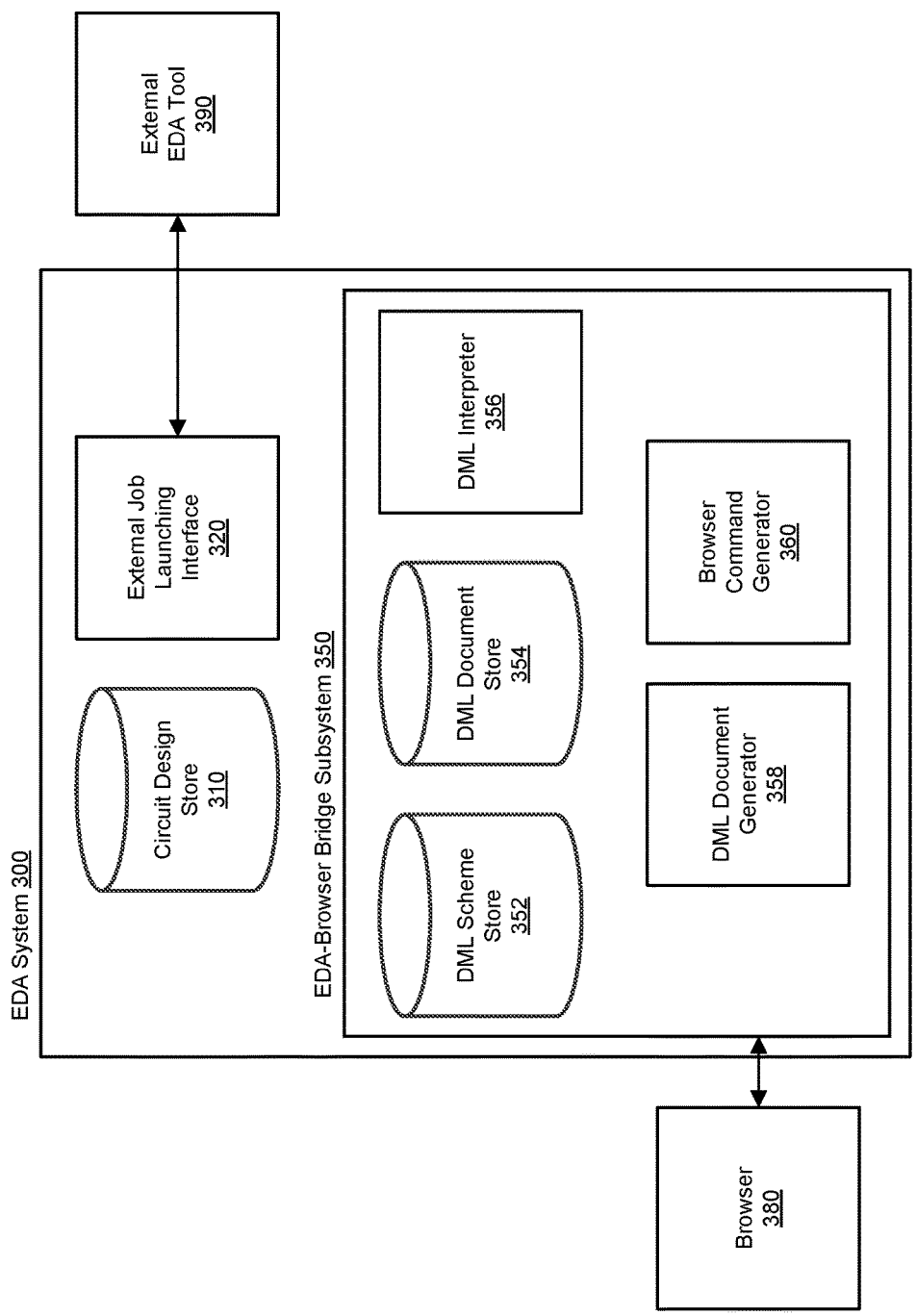
FIG. 3 is a block diagram illustrating an architecture of an EDA system capable of interacting with a browser, according to one embodiment.

FIG. 3 is a block diagram illustrating an architecture of an EDA system 300 capable of interacting with a browser 380 and an external EDA tool 390, according to one embodiment. The EDA system 300 shown in FIG. 3 includes a circuit design store 310, an external job launching interface 320, and an EDA-browser bridge subsystem 350. In other embodiments, the EDA system 300 may include additional, fewer, or different components for various applications. Each of the aforementioned components may be embodied as modules in memory 204 of a computer of the EDA system 300. Conventional components such as network interfaces, security functions, load balancers, failover servers, management and network operations consoles, and the like are not shown so as to not obscure the details of the system architecture.

The circuit design store 310 is a database that stores physical layout data for one or more circuits. Physical layout data for a particular circuit includes a (physical) connection layout, a schematic, schematic-layout mapping information, a number of metal layers to be used, and physical processes associated with fabricating the circuit. The circuit design store 310 also stores name-mapping information, such as the correspondence between object names in files that use two different conventions. For example, the EDA system 300 may use a different naming convention than an external EDA tool 390. Although the circuit design store 310 is described as a part of the EDA system 300, the circuit design store 310 may be part of another system outside of the EDA system 300 in some embodiments. For example, the circuit design store 310 may be embodied as an OpenAccess database.

The external job launching interface 320 allows the EDA system 300 to interact with external EDA tools 390, which are explained below. The external job launching interface 320 sends the relevant circuit design information from the circuit design store 310 to the external EDA tools 390 for processing. Circuit design information may be in a binary or ASCII text file, or the native scripting language of the EDA system 300 (e.g., Tcl). In some embodiments, the external job launching interface 320 also receives the output files (e.g., in binary, ASCII, or Tcl) from the external EDA tools 390. In some embodiments, the external EDA tools 390 output HTML files.

The EDA-browser bridge subsystem 350 is hardware, software, firmware or a combination thereof that enables users to extend the EDA system 300 through the browser 380, which is more accessible in terms of programming languages. The EDA-browser bridge subsystem 350 may include, among other components, a design markup language (DML) scheme store 352, a DML document store 354, a DML interpreter 356, a DML document generator 358, and a browser command generator 360. As with the EDA system 300, the EDA-browser bridge subsystem 350 may include additional, fewer, or different components in some embodiments. Each of the aforementioned components may be embodied as modules in memory 204 of a computer of the EDA system 300.

The DML store 352 is a database that stores instructions for interpreting URIs encoded in the DML URI scheme and other references to the EDA system 300. For URIs, the instructions specify what each of the fields of the URI correspond to, and which actions the EDA system 300 should take in response to various values in those fields. Other references can include embedded scripts and/or objects, which require collaboration between the EDA system 300 and the browser 380 to render a markup language document. The DML store 352 may be alternatively implemented as part of the DML interpreter 356 such that the instructions are hardcoded into the DML interpreter 356 rather than stored in a separate database.

In one embodiment, the DML URI scheme takes the following form:

```
uri := "dml:" namespace ":" link-type ":" path_identifier [parameters]
namespace := ("db" | "mapped1" | "mapped2" | ...)
link-type := ("net" | "inst" | "term" | "instTerm" | "param" |
"design" | "any" | ...)
path_identifier := identifier
parameters := ( parameters [parameter] )
parameter := &identifier=identifier
```

The specific keywords used above and described below are merely exemplary and may be replaced with other keywords indicative of similar functionality. "dml" indicates that the DML scheme should be followed. However, this is arbitrary and the scheme could feasibly be named anything that complies with the rest of the markup language protocol. The namespace indicates which naming convention should be used. Generally, there are two different types of namespaces: unmapped ("db"), which represents the standard naming of the EDA system 300 stored in the circuit design store 310, and mapped ("mapped1," "mapped2," . . . ), which indicates that the URI is not using the standard naming convention of the EDA system 300 and name-mapping is required. For example, URIs indicating that the "netlist" namespace of a simulation program with integrated circuit emphasis (SPICE) simulator is used require name mapping from the "netlist" namespace of the SPICE simulator to the native "db" namespace of the EDA system 300. Outputs of different external EDA tools 390 may be associated with different namespace values (i.e., mapped1 corresponds to one external EDA tool 390, and mapped2 corresponds to another).

The link-type is used to specify the type of integrated circuit (IC) design object. "net" indicates that the object is a net, a conductor connecting two or more pins of a circuit. "inst" indicates that the object is a instance, which refers to a lower-level design. "term" indicates that the object is a terminal, which indicates a logical connection point of an instance. "instTerm" indicates that the object is an instance terminal, which is a terminal of a lower-level instance. "param" indicates that the object is a parameter, such as a particular value (e.g., resistance of a resistor, capacitance of a capacitor). These parameters differ from those below because they are IC design objects, not used to modify DML references. "design" indicates that the object is a design cell (e.g., an amplifier, a comparator, a power management unit) that corresponds to a schematic, layout, or textual (e.g., Verilog module, SPICE subcircuit) design.

The path_identifier specifies the path to the design object, which is often hierarchical. That is, navigating to a particular terminal would require that the instance that the terminal belongs to is also specified. Inclusion of the full path to the design object allows the EDA system 300 to find the correct IC design object when it is performing EDA operations. For example, for a design "d0" with two amplifiers "i0" and "i2" that both have terminals "t0" and "t1", a DML reference such as "dml:mapped1:term:d0/t0" may refer to a terminal "t0" on either of the amplifiers "i0" and "i1". For this reason, the full path to the IC design object (d0/i0/t0 or d0/i1/t0) is included in the DML reference.

The parameters are used to pass additional information that can allow for increased customizability. Parameters can be appended to a reference similarly to hypertext transfer protocol (HTTP) GET requests (i.e., "?name1=value1?name1=value2 . . . "). Parameters can include "action," which specifies an action to be performed when the reference is selected, and "viewport," which defines a particular navigating viewport (expressed in terms of two defining points). In some embodiments, the "viewport" parameter defines minimum dimensions of the viewport displayed by the browser 380 rather than absolute viewport dimensions. Identifiers, which can be included as parameters, are encoded according to RFC 1738 to remove unsafe and ambiguous characters (e.g., "?"). Additional parameters are discussed in conjunction with the DML interpreter 356 described below.

The DML scheme described above results in example URIs that can be interpreted as follows. The URI "dml:db:net:/i1/A" leads to an IC net named "A" in the "database" namespace (e.g., the database used by the EDA system 300) within the instance "i1." The URI "dml:db:term:/i1/A" leads to an IC terminal named "A" in the database namespace within the cellview bound to the instance i1." The URI "dml:db:instTerm:/i1/A" leads to an IC instance terminal in the database namespace named "A" on instance "i1" within the top cellview. The URI "dml:netlist:term:xi1.a" leads to a terminal named "a" in the netlist namespace within the subcircuit cellview bound to "xi1". The URI "dml:db:net:/i3/n?action=saPlot" leads to a net named "/i3/n" in the database namespace. The parameter named "action" with a value of "saPlot" indicates that the corresponding EDA operation by the EDA system 300 is to plot a waveform (e.g., voltage vs. time; voltage vs. frequency) for the net "n."

As noted above, the DML store 352 also stores other references to the EDA system 300 when applicable. These references can include embedded scripts and objects, which allow for more complicated actions to be performed the cooperating EDA system 300 and browser 390. For a script, the browser 390 may be instructed to refer back to the EDA system 300 whenever a specific scripting language is encountered. Similarly, for an object, specific object classes may be associated with the EDA system 300 and be appropriately routed back the EDA system 300 when encountered.

The DML document store 354 is a database that stores DML documents, such as those created by the DML document generator 358, described below, or an external tool. A DML document is a script that is interpretable to a browser and includes DML references. For example, DML documents have text/html mime type in one embodiment. In some embodiments, DML documents can also include embedded scripting and/or objects, which are described in the DML section below.

The DML interpreter 356 is software, hardware, firmware or a combination thereof that applies the instructions stored in the DML scheme store 352 to specific DML references to generate actionable commands for the EDA system 300. In some embodiments, the commands are implemented in the native scripting language of the EDA system 300 (e.g., Tcl.) Alternatively, the commands may be relayed through a lower level language (e.g., binary). The DML interpreter 356 also runs embedded scripts received by the browser 380 and sends the output back to the browser 380, which renders it.

The actionable commands determined by the DML interpreter 356 can include, among others, probing circuit nets and instances in a circuit schematic editor, probing circuit nets and instances in a circuit layout editor, plotting waveforms corresponding to the time or frequency domain behavior of electrical circuit nets/wires, placing a (layout) instance within a schematic-driven layout (thus providing a text-driven layout capability), cross-referencing extracted parasitics between layout and schematic nets or instances, cross-referencing objects reported as missing or inconsistent in LVS reports, opening library manager and navigating to the selected library, cell and/or view, posting a context sensitive menu (CSM) containing a list of applicable actions for the given link, and custom actions.

Additionally, one or more default actions may be associated with different object types. The DML interpreter 356 may instruct the EDA system 300 to perform these default actions for DML references with the corresponding object types, unless the DML reference includes syntax describing an action. A default set of actions for an "inst" (instance), for example, may be navigating to the design where the instance is placed, creating a probe on the specified instance, and zooming to fit the instance. A default set of actions for a "design," for example, may be navigating to the design of the specified path. A default set of actions for a "net," for example, may be navigating to the design where the net exists and adding a probe to the net. A default set of actions for a "term" (terminal) or an "instTerm" (instance terminal), for example, may be navigating to the design where the object exists and adding a probe. A default set of actions for a "parameter," for example, may include navigating to the design associated with the parameter, selecting the associated instance or via, displaying the property editor (PE) associated with the parameter, and selecting the specified parameter.

One of many advantages of the DML scheme is its ability to automatically perform name mapping. Rather than having the user translate the names of all of the IC design objects into the namespace used by the EDA system 300 manually, the DML interpreter 356 can apply name mapping files it already has access to, such as those stored in association with the circuit in the circuit store 310. These name mapping files may be stored in the circuit store 310 after being received from the corresponding external EDA tool 390. For example, in response to the EDA system 300 sending circuit data to an external EDA tool 390, the external EDA tool 390 sends a list of names and the objects to which they correspond to the EDA system 300. In some embodiments, the appropriate name mapping files (or other name mapping data) are easily found because they are stored in the same directory of the DML document or in at a search path that is relative to that of the DML document, However, in some embodiments, the name mapping files may be more difficult to find (e.g., an external tool may be chose to store the name mapping files anywhere in the file system). In these cases, a pointer to the correct directory may be embedded in the DML document (e.g., by an external tool that created the DML document and chose where to store the name mapping files).

The DML document generator 358 is software, firmware, hardware or a combination thereof that generates markup language documents that include DML references and are interpretable by the browser 380 from non-markup language or browser-incompatible documents or files. Additional instructions on how the markup language document is to be generated may apply. For example, a text file containing IC simulation results can be parsed and organized into the appropriate markup language format, adding URIs hyperlinks for each IC design object mentioned. The non-markup language or browser-incompatible documents or files may be provided by the EDA system 300 itself, or an external EDA tool 390.

The browser command generator 360 is software, firmware, hardware or a combination thereof that allows the EDA system 300 to relay actions back to the browser 380. That is, the EDA system 300 can instruct the browser 380 to perform a specific command, such as changing the navigating window such that it zooms in on a particular feature of an IC. The browser command generator 360 generates strings encoding the command in a scripting language interpretable by the browser (e.g., JavaScript). These browser commands may include commands to modify its document object model (DOM), commands to change the display characteristics or style of the information it is currently displaying, or commands to navigate to a new page.

The browser 380 can interact with the EDA system 300 appropriately after it receives "dml" (or a similar scheme prefix) URIs that is to be passed to the EDA system 300 and/or can receive commands from the EDA system 300. This can be done by registering the DML scheme with the browser 380. In one embodiment, the browser 380 is linked to the EDA system 300 with a browser plugin. In another embodiment, the browser 380 is embedded in the EDA system 300. Functionality that is not necessarily included in the DML scheme (e.g., embedded objects) can be added through the use of browser plugins or integration systems.

One or more external EDA tools 390 provide additional functionality to the EDA system 300 through its external job launching interface 380. External EDA tools 390 include, for example, simulator, layout versus schematic (LVS), design rule checking (DRC), and report generator tools. However, external EDA tools 390 providing other functionality may be used with the EDA system 300. In some embodiments, external EDA tools 390 generate DML documents that are rendered by the browser 380. In other embodiments, The external EDA tools 390 do not create documents renderable by the browser 380 and instead output a file that is translated by the EDA system 300.

Performing Actions in an EDA System Through a Browser

Figure 4A:
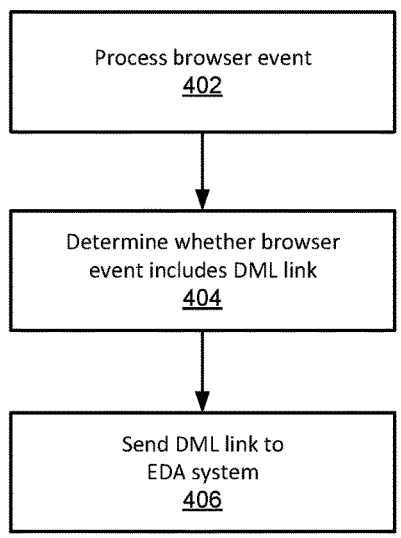
FIG. 4A is a flowchart illustrating a method for a browser to process a DML link, according to one embodiment.
Figure 4B:
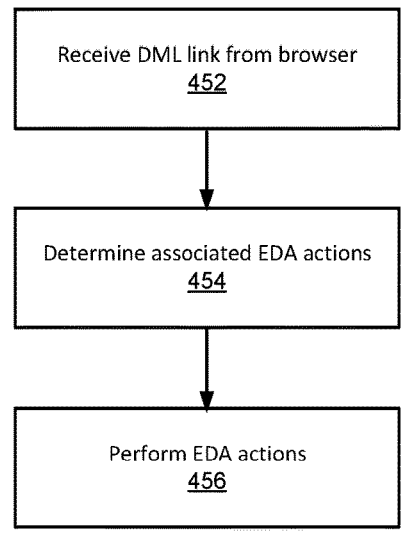
FIG. 4B is a flowchart illustrating a method for an EDA system to implement a DML link received from a browser, according to one embodiment.

FIGS. 4A and 4B are flowcharts illustrating portions 400 and 450 of a method for processing a DML link from the perspective of the browser 380 and the EDA system 300, respectively, according to one embodiment. The browser 380 receives markup language documents, such as those generated by the EDA system 300 or corresponding external EDA tools 390. On its face, the browser 380 treats the DML document as any other markup language document and renders a page of information corresponding to the DML document. However, because the DML scheme is registered with the browser 380, it identifies that the "dml:" references should be passed to the EDA system 300, instead of processed according to another scheme, such as HTTP.

Users interact with the browser as they would any other rendered page of information (e.g., a web page), and as they do so, the browser 380 generates and processes browser events responsive to user interactions with specific portions of the page of information. For example, the browser generates browser events in response to user selection of links. When the browser processes 402 an event, it performs the action specified by the portion of the markup language document corresponding to the portion of the page of information that the user interacted with, such as navigating to a web page corresponding to a selected link. However, if the browser 380 determines 404 that the browser event includes a DML link (i.e., a user interaction corresponds to a URI beginning with "dml"), the browser 380 sends 406 the URI to the EDA system 300.

The EDA system 300 receives 452 the DML URI from the browser 380. It parses the URI and interprets the pieces to determine 454 which EDA actions to take. The URI may just specify an IC design object, in which case the EDA system 300 retrieves and performs 456 default EDA actions for that object. Alternatively, the URI may specify one or more parameters in addition to the IC design object, which overrides the default EDA actions when applicable.

Figure 5:
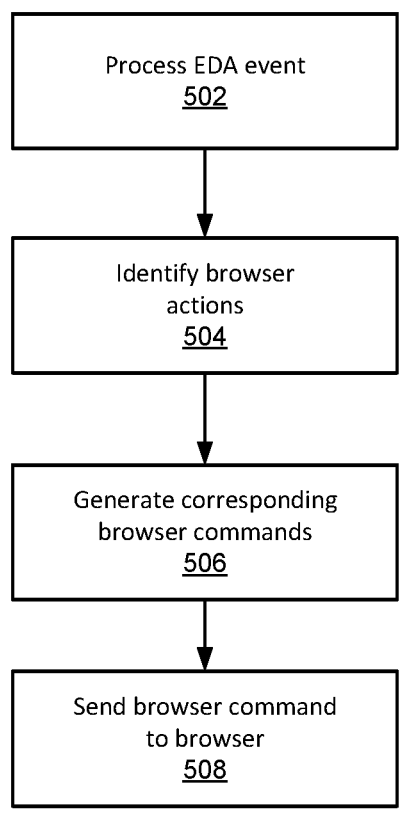
FIG. 5 is a flowchart illustrating a method for an EDA system to send commands to a browser, according to one embodiment.

FIG. 5 is a flowchart illustrating a method for an EDA system 300 to send commands to the browser 380, according to one embodiment. Like the browser 380, the EDA system 300 may have an event loop, triggered by user interactions, or information received (e.g., a DML reference).

When processing 502 an EDA event, the EDA system 300 executes its script (or other code) and determines that an action should be performed by the browser 380. In one embodiment, the EDA system 300 determines that an action should be performed based on knowledge of DML document that is being rendered by the browser 380. For example, the EDA system 300 may have generated the DML document. When information displayed in the browser 380 is updated or otherwise changed in the EDA system 300 (e.g., through a schematic editor), the EDA system 300 recognizes that this information should also be updated in the browser 380. In another embodiment, a DML reference passed to the EDA system 300 indicates that a command should be sent to the browser 380 as part of the EDA operations the EDA system 300 performs based on the DML reference. Specifically, the DML reference may include commands from an EDA API of the EDA system 300 that is used by external EDA tools 390 when interacting with the EDA system 300. For example, the EDA API may define custom commands that prompt the EDA system 300 to call certain JavaScript functions in the browser 380.

After the EDA system 300 has identified 504 one or more browser actions, it generates 506 the corresponding browser commands, which are sent 508 to the browser 380 for execution.

Methods 400 and 450, and method 500 can occur independently, or in tandem. That is, the EDA system 300 may receive a DML link and determine that one of the EDA actions encoded in the link also requires the browser to perform an action (or vice versa).

Example Interactions Between an EDA System and a Browser

Figure 6:
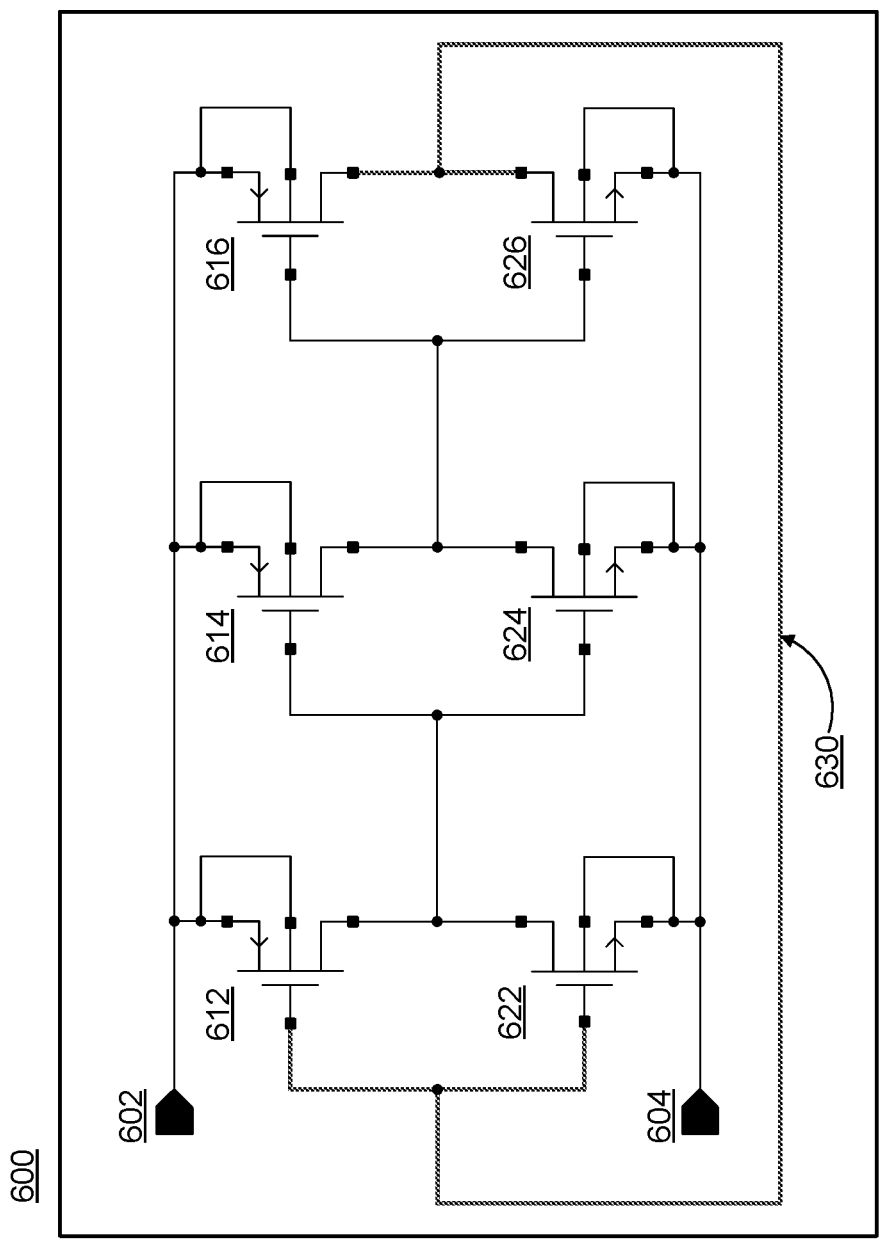
FIG. 6 is an example of an EDA action responsive to user interactions with DML references in a browser, according to one embodiment.

FIG. 6 is an example of an EDA action responsive to user interactions with DML references in a browser, according to one embodiment. Schematic 600 has terminal pins 602 and 604, PMOS transistors 612, 614, and 616, and NMOS transistors 622, 624, and 626, which are all connected by nets. Each square represents a terminal of the transistor, and each circle represents the intersection of two conductors.

In this example, a user was previously interacting with a browser that had a DML link. When processing 402 that browser event, the browser determined 404 that the event included a DML link and sent 406 it to the EDA system 300. Schematic 600 has net 630 highlighted, as a result of a user clicking a DML link. The EDA system 300 receives 452 the DML link, and determines 454 that the associated EDA actions are to probe net 630 of schematic 600. Accordingly, the EDA system 300 performs 456 this action of probing net 630 and displays schematic 600 with net 630 highlighted.

Figure 7:
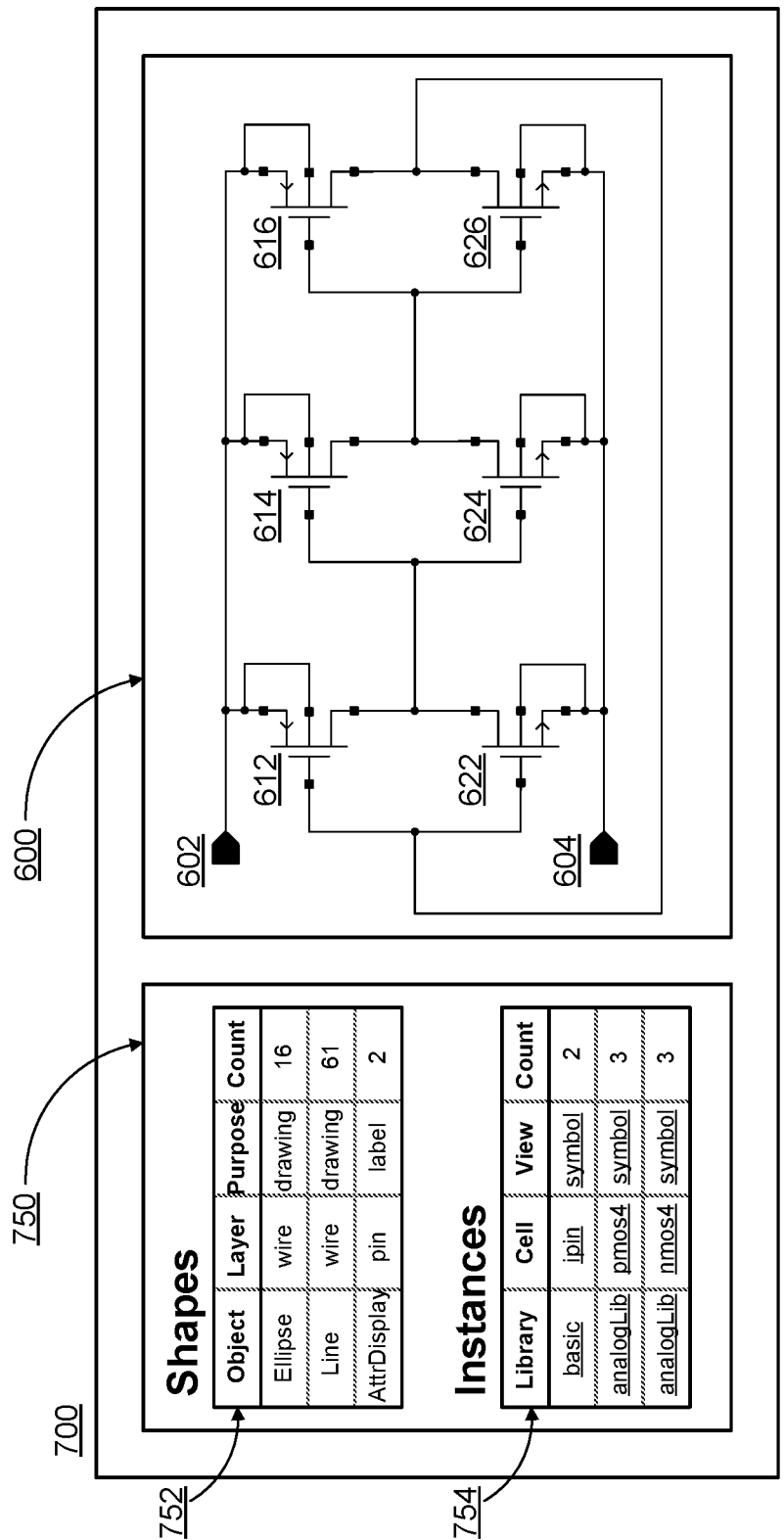
FIG. 7 is an example browser interface with DML links and an embedded EDA object, according to one embodiment.

FIG. 7 is an example browser interface with DML links and an embedded EDA object, according to one embodiment. Browser interface 700 includes two panels. Panel 750 displays table 752 ("Shapes") and table 754 ("Instances"), which correspond to schematic 600 in the second panel. Each of the links (shown as underlined text) is a DML reference associated with a different EDA action. For example, selecting any of the links in table 754 would prompt (responsive to receiving the DML reference from the browser) the EDA system 300 to display a library manager interface of the EDA system 300 with the selected object highlighted in the library, saving the user tedious scrolling and selecting trying to find a particular IC design object. The user could select the "basic" DML link, which would prompt the EDA system 300 to open the library manager with the "basic" library selected. The library manager may be displayed in another window (e.g., one launched by the EDA system 300 instead of the browser), or be embedded in the window containing the schematic (e.g., replacing schematic 600). Similarly, the user could select the "pmos4" DML link, which would prompt the EDA system 300 to open the library manager with the "analogLib" library and the "pmos4" cell selected.

In one embodiment, the DML document rendered as a page of information displayed in panel 750 has been generated by the EDA system 300. Responsive to certain user actions (e.g., those included in the rendered page of information) within the EDA system 300, the EDA system 300 may decide to "update" panel 750 via a JavaScript string sent to the browser 380. For example, if a user descends or ascends in the schematic hierarchy of embedded schematic 600 (which is effectively an interaction with the EDA system 300 rather than the browser 380), the EDA system 300 may construct and send a JavaScript string instructing the browser 380 to re-create the Shapes table 752 and Instances table 754 to reflect the shapes and instances in the newly navigated-to level of schematic hierarchy. The JavaScript string, when executed by the browser 380, then causes the tables 752 and 754 in the browser 380 to be synchronized with the current schematic level.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for modifying an integrated circuit (IC) design having a plurality of IC design objects, the method comprising:
   generating, by a browser executing on a computer, a page of information by rendering a markup language document, the page of information including one or more references encoded in a scheme registered with the browser, each of the one or more references represents an integrated circuit (IC) design object of the plurality of IC design objects;
   receiving, by the browser, a user interaction associated with one of the one or more references in the generated page of information;
   generating, by the browser, a browser event responsive to the user interaction;
   processing, by the browser, the generated browser event;
   determining, by the browser, whether the processed browser event is associated with the reference of a specific type; and
   responsive to the reference being of the specific type, sending the user interaction and the reference from the browser to an electronic design automation (EDA) system to cause the EDA system to modify a corresponding IC design object in the IC design associated with the reference.

2. The method of claim 1, wherein the markup language document is in a web scripting language.

3. The method of claim 2, wherein the web scripting language is HTML.

4. The method of claim 1, wherein the reference specifies a mapped namespace.

5. The method of claim 1, wherein the user interaction comprises selecting a link associated with the reference and displayed by the browser.

6. The method of claim 5, wherein the link is part of a context sensitive menu.

7. The method of claim 1, wherein the page of information includes a context sensitive menu, the context sensitive menu displaying a plurality of links that are each associated with a different action that can be taken for the IC design object.

8. The method of claim 1, wherein the page of information presents report results, one or more of the report results about the IC design object is presented as a link to a uniform resource identifier (URI) reference.

9. The method of claim 1, further comprising:
receiving a command by the browser from the EDA system; and;
executing the received command.

10. The method of claim 9, wherein the command is a JavaScript string.

11. A method for modifying an integrated circuit (IC) design having a plurality of IC design objects, the method comprising:
receiving, at an electronic design automation (EDA) system, a reference and a user interaction associated with the reference sent from a browser responsive to the user interaction and the reference being of a specific type, the reference encoded in an EDA scheme registered with the browser, and the reference representing an IC design object of the plurality of IC design objects;
determining, by the EDA system, one or more EDA operations to perform on a corresponding IC design object in the IC design associated with the reference, based on the received user interaction and the reference; and
modifying, by the EDA system, the corresponding IC design object by performing the one or more EDA operations on the IC design object.

12. The method of claim 11, wherein the reference specifies an object type of the IC design object.

13. The method of claim 12, wherein the object type is chosen from a group comprising: net, instance, terminal, instance terminal, parameter, and design.

14. The method of claim 12, wherein each type of object is associated with a set of default EDA operations.

15. The method of claim 11, wherein the reference specifies a namespace used by the IC design object.

16. The method of claim 15, wherein the reference specifies a path to the IC design object within the namespace.

17. The method of claim 15, wherein the namespace is a set of names used for the IC design object by an EDA tool interacting with the EDA system, the set of names used by the EDA tool different from a set of names used by the EDA system.

18. The method of claim 17, wherein the one or more EDA operations comprise mapping a path specified in the reference to a path used by the EDA tool according to the specified namespace.

19. The method of claim 11, wherein the reference specifies at least one of the one or more EDA operations.

20. The method of claim 11, wherein the one or more EDA operations involve sending a command to the browser.

* * * * *